United States Patent
Huang

(10) Patent No.: US 8,251,519 B2
(45) Date of Patent: Aug. 28, 2012

(54) LIGHT INTEGRATION APPARATUS FOR USE IN A PROJECTION DEVICE

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 398 days.

(21) Appl. No.: 12/537,073

(22) Filed: Aug. 6, 2009

(65) Prior Publication Data

US 2010/0045939 A1 Feb. 25, 2010

(30) Foreign Application Priority Data

Aug. 19, 2008 (TW) .............................. 97131607 A

(51) Int. Cl.
*G03B 21/14* (2006.01)
(52) U.S. Cl. ............................................................ 353/94
(58) Field of Classification Search .................... 353/30, 353/33, 81, 94, 98, 99; 349/5–9; 362/551, 362/234–245; 385/133, 901
See application file for complete search history.

(56) References Cited

U.S. PATENT DOCUMENTS

| | | | |
|---|---|---|---|
| 6,325,514 B1 * | 12/2001 | Yamamoto | 353/31 |
| 7,108,377 B2 * | 9/2006 | Kurosaka et al. | 353/33 |
| 7,159,991 B2 * | 1/2007 | Ito | 353/98 |
| 7,437,034 B2 * | 10/2008 | Gerets et al. | 385/36 |
| 7,972,016 B2 * | 7/2011 | Yeh et al. | 353/81 |
| 2004/0233655 A1 * | 11/2004 | Zimmerman et al. | 362/19 |
| 2006/0285084 A1 * | 12/2006 | Lin | 353/84 |

* cited by examiner

*Primary Examiner* — William C Dowling
(74) *Attorney, Agent, or Firm* — Patterson Thuente Christensen Pedersen, P.A.

(57) ABSTRACT

A light integration aparatus for use in a projection device is provided. The light integration apparatus comprises the first integration rod and the second integration rod symmetrically disposed with respect to a symmetric axis. The light emerging ends of the first integration rod and the second integration rod are both disposed towards the symmetric axis. Thus, the light is adapted to be guided through the first integration rod and the second integration rod, and emerge from the light emerging ends to travel parallel to the symmetric axis.

12 Claims, 6 Drawing Sheets

LIGHT INTEGRATION APPARATUS FOR USE IN A PROJECTION DEVICE

CROSS-REFERENCES TO RELATED APPLICATIONS

This non-provisional application claims priority under 35 U.S.C. §119(a) on Patent Application No(s). 097131607 filed in Taiwan, Republic of China on Aug. 19, 2008, the entire contents of which are hereby incorporated by reference.

BACKGROUND OF THE INVENTION

1. Field of the Invention

The present invention relates to a light integration apparatus for use in a projection device, and more particularly, to a light integration apparatus that utilizes integration rods to integrate multiple light sources.

2. Descriptions of the Related Art

Currently, projection devices are widely used in offices, houses, conference rooms and places of the like. A projection device generally includes a light source, a prism, a color wheel, an imaging lens and other optical components. Before being projected, light emitted from the light source is integrated by an integration rod and then travels into the color wheel and the imaging lens. Accordingly, the arrangement and design of the integration rod have become a key technology in the projection device.

Among various types of projection devices, the digital light processing (DLP) projection device is capable of receiving a digital signal and generating a sequence of digital light pulses. The internal arrangement of a conventional DLP projection device 1 is shown in FIG. 1. The projection device 1 includes a light source 11, an integration rod 12, a color wheel 13, a light coupling device 14, a digital micromirror device (DMD) 15 and a lens 16. FIG. 1 simply shows a single-chip DMD 15 and a single light source 11 for purpose of illustration, and the light source 11 is preferred to be an ultra-high pressure (UHP) lamp, because the ultra-high pressure (UHP) lamp has the advantages of low cost and high light emission efficiency. In the arrangement shown in FIG. 1, the color wheel 13 is used for filtering the light emitted from the light source 11 into three primary colors. Specifically, after the light passes through the integration rod 12, a preliminary imaging takes place and, through the color wheel 13 that disposed at the back end of the integration rod 12, the light of the three primary colors are selectively generated. Subsequently, the light enters the light coupling device 14 and is reflected by various micromirror structures of the DMD 15 in a controllable manner before being projected from the lens 16.

An illumination structure with multiple light sources integrated therein is considered in the prior art to improve light intensity. FIG. 2A shows such an illumination structure with two light sources integrated therein. In this structure, light emitted from the first light source 211 and light emitted from the second light source 212 are integrated in a prism 221 before entering the integration rod 223. As shown, the light emitted from the first light source 211 is internally reflected by the prism 221, while the light emitted from the second light source 212 is internally refracted in the prism 221, so that the light emitted from the first light source 211 and the second light source 212 are integrated and then be projected in the same direction. The first light source 211 and the second light source 212 can be placed at different locations according to the internal arrangement of the projection device, and the light emitted from the first light source 211 and the light emitted from the second light source 212 can be integrated into a uniform light source with a size suited to the DMD.

Another conventional illumination structure with four light sources integrated therein is shown in FIG. 2B. The first light source 211, the second light source 212, the third light source 213 and the fourth light source 214 are disposed horizontally in the projection device. More specifically, the first light source 211 and the second light source 212 are disposed opposite to each other at both sides of a first reflecting prism 231 and a first integration rod 241, and light therefrom is reflected by the first reflecting prism 231 towards the longitudinal direction of the first integration rod 241 to be integrated therein. Similarly, the third light source 213 and the fourth light source 214 are disposed opposite to each other on both sides of the second reflecting prism 232 and second integration rod 242, and light therefrom is reflected by the second reflecting prism 232 towards the longitudinal direction of the second integration rod 242 to be integrated therein. Finally, all the light enters a third integration rod 243 and is integrated into a uniform light source with a size suited to the DMD.

However, the conventional illumination structures have a number of drawbacks. First, in each of the above arrangements, an integration rod for integrating light (e.g. the integration rod 223 or the third integration rod 243 described above) has to be disposed at the back end for eliminating the dark lines due to the prism boundaries at the front end and integrating light from different light sources into a single light source with a size suited to the DMD. Conceivably, the more integration rods or optical components that are used in the light integration process, the more light will be lost and the assembling of the projection device will be more complicated.

Furthermore, the conventional arrangement of the light sources described above presents the difficulty in heat dissipation management. Because for lowering the high temperature of the bulbs of the light sources, a plurality of cooling fans have to be disposed adjacent to the bulbs of the light sources respectively, and a fan disposed for guiding hot air out of the projection device is also necessary. However, in the conventional illumination structure shown in FIG. 2B, all the light sources are disposed at the same horizontal level, which makes it relatively difficult to arrange a number of fans and is also unfavorable for arrangement of elements within the projection device. Consequently, unsmooth air circulation occurs and brings about poor heat dissipation, high operation temperature and short life-span of the bulbs. Moreover, disposing the light sources on the same horizontal level makes it difficult to replace light sources, so that the maintenance cost is increased.

SUMMARY OF THE INVENTION

One objective of the present invention is to provide a light integration apparatus for use in a projection device, which is capable of integrating multiple light sources. By eliminating some integration rods disposed at the back end, the light integration apparatus of the present invention can prevent unnecessary light loss and improve the efficiency of utilizing light sources.

Another objective of the present invention is to provide a light integration apparatus for use in a projection device, which is capable of forming an uniform light source with a size suited to the DMD. Light emitted from different light sources is integrated to travel in a direction parallel to the symmetric axis by disposing two integration rods symmetrically with respect to the symmetric axis. In this way, it is easier to maintain and replace the components as well as maintain a simplified arrangement of the light source. In addition, the efficiency of heat dissipation is increased.

To this end, a light integration apparatus for use in a projection device is provided. The light integration apparatus comprises a first integration rod and a second integration rod symmetrically disposed with respect to a symmetric axis. Both the first integration rod and the second integration rod include a longitudinal direction, a body portion, a light emerging end and a light incident end. The body portion extends along the longitudinal direction. The light emerging end faces the symmetric axis and comprises a light emerging surface. The light incident end is opposite the light emerging end and comprises a light incident surface. With this arrangement, a first light and a second light from different light sources are respectively guided into the body portions of the first integration rod and the second integration rod through the light incident surfaces thereof. Both the first light and the second light subsequently travel along the longitudinal direction and then are refracted by the light emerging surfaces of the first integration rod and the second integration rod respectively to travel in a direction substantially parallel to the symmetric axis.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the light integration apparatus of the present invention will be explained with reference to embodiments thereof. However, these embodiments are not intended to limit the present invention to any specific environment, applications or particular implementations described in these embodiments. The description of these embodiments is only for purpose of illustration rather than limitation. It should be appreciated that in the following embodiments and the attached drawings, elements not related directly to the present invention are omitted from depiction; and dimensions of elements depicted are only for ease of understanding, but not for limitation.

Figure 3A:
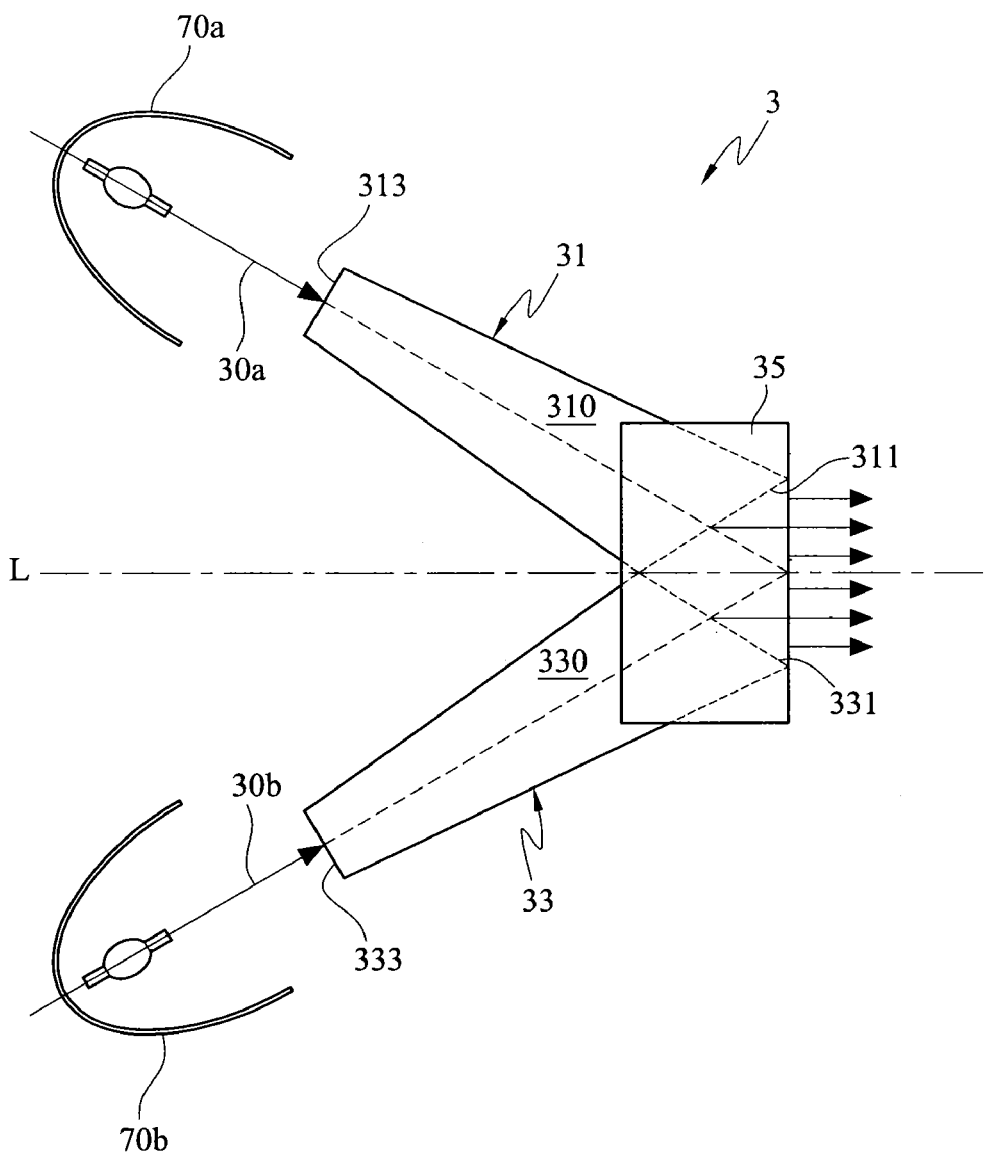
FIG. 3A is a plan view of the first embodiment of the present invention.
Figure 3B:
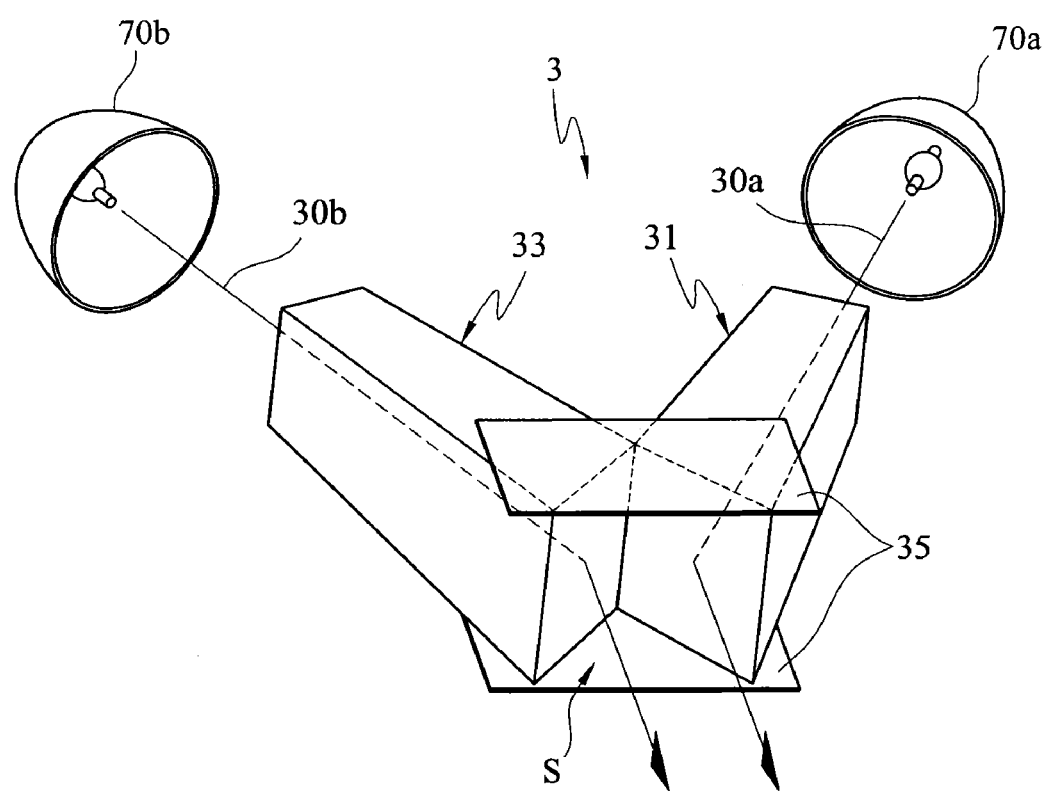
FIG. 3B is a three-dimensional illustration of the first embodiment of the present invention.

FIGS. 3A and 3B illustrate the first embodiment of the light integration apparatus of the present invention. The light integration apparatus is for use in a projection device with two light sources (including a first light source 70a and a second light source 70b). FIG. 3A is a schematic plan view of the light integration apparatus of the projection device, and FIG. 3B is a three-dimensional illustration of the light integration apparatus. The light integration apparatus 3 includes a first integration rod 31 and a second integration rod 33 which are symmetrically disposed with respect to the symmetric axis L. In order to illustrate the present invention more clearly, both the first integration rod 31 and the second integration rod 33 are further defined with a longitudinal direction respectively in which a body portion 310 of the first integration rod 31 and a body portion 330 of the second integration rod 33 extend. At both ends of the first integration rod 31 and the second integration rod 33 are light emerging ends 311, 331 and light incident ends 313, 333 respectively. Both the light emerging ends 311, 331 have a light emerging surface, and both the light incident ends 313, 333 have a light incident surface. The light emerging ends 311 of the first integration rod 31 and the light emerging ends 331 of the second integration rod 33 are arranged to face toward the symmetric axis L. As shown, a first light 30a and a second light 30b emitted from the first light source 70a and the second light source 70b are guided into the body portions 310, 330 through the light incident surface of the light incident end 313 of the first integration rod 31 and the light incident surface of the light incident end 333 of the second integration rod 33 respectively. Subsequently, the first light 30a and the second light 30b are refracted at light emerging surfaces of the light emerging ends 311, 331 respectively and then travel in parallel with the symmetric axis L.

In this embodiment, the light incident surfaces of the light incident ends 313, 333 are substantially perpendicular to the longitudinal directions of the first integration rod 31 and the second integration rod 33 respectively, so that the first light 30a and the second light 30b emitted from the first light source 70a and the second light source 70b respectively travel into the light incident ends 313, 333 in a direction perpendicular to the incident surfaces thereof. However, it should be noted that the light incident surfaces of the light incident ends 313, 333 do not have to be perpendicular to the longitudinal directions of the light incident ends 313, 333 respectively in other embodiments. For example, the first light 30a and the second light 30b may be refracted into the body portions 310, 330 at the incident surfaces of the light incident ends 313, 333 in certain angle and then travel along the longitudinal direction. Therefore, various light incidence manners can be designed by those of ordinary skill in the art, and no limitation is made herein.

Figure 4:
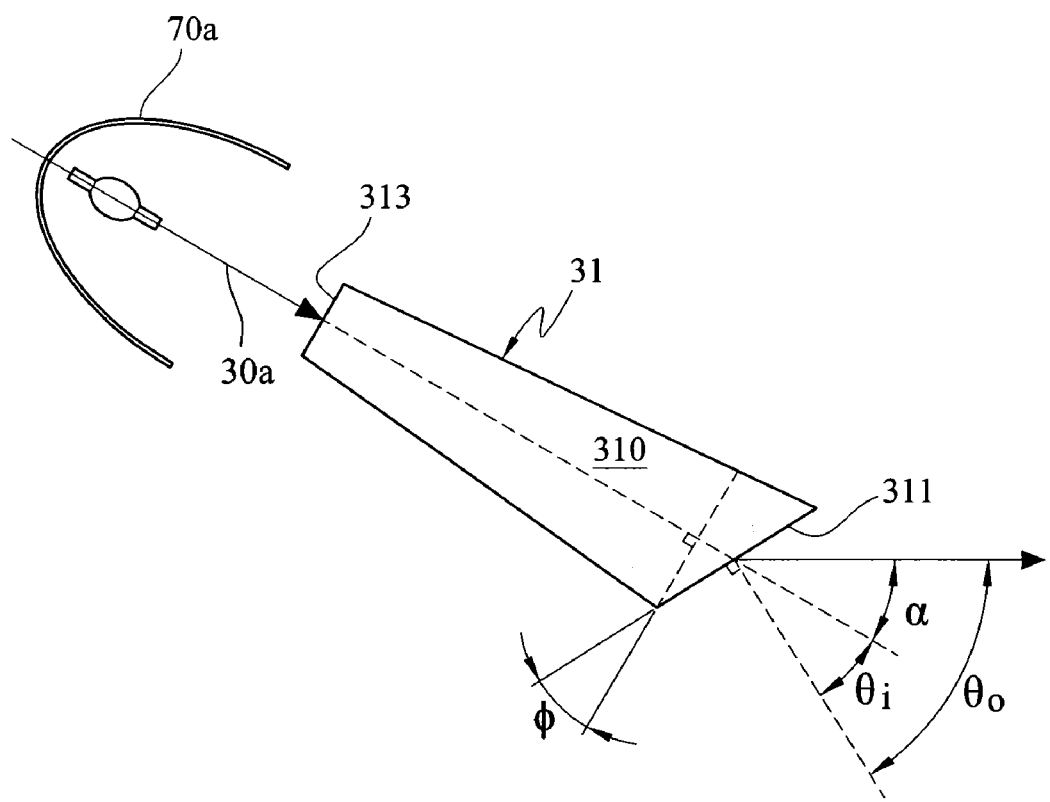
FIG. 4 is a schematic partial plan view of the first embodiment of the present invention.

In order to illustrate the technique of the present invention more specifically, part of the structure as shown in FIG. 3A will be further discussed with reference to FIG. 4. FIG. 4 only illustrates how the first light 30a emitted from the first light source 70a is guided through the first integration rod 31. Firstly, the included angle between the longitudinal direction of the first integration rod 31 and the symmetric axis L (not shown in FIG. 4) is defined as the first angle α. In other words, the first angle α is the same as the included angle between the propagating direction of the first light 30a in the body portion 310 and the direction that the first light 30a emerges from the light emerging surface of the light emerging ends 311, because the light integration apparatus 3 of the present invention is intended to make the first light 30a to travel in the longitudinal direction of the first integration rod 31 after traveling into the body portion 310 and then to travel in the direction parallel to the symmetric axis L.

Additionally, the included angle between a normal line N of the light emerging surface of the light emerging end 311 and the longitudinal direction of the first integration rod 31 is defined as the second angle $\theta_i$. Between the direction that the first light 30a emerges from the light emerging surface of the light emerging ends 311 and the normal line N of the light emerging surface of the light emerging ends 311, an angle $\theta_0 = \alpha + \theta_i$ is included. It is clear in FIG. 4 that the first integration rod 31 has a wedge structure at the light emerging end 311. The wedge structure has an angle φ so that the first light 30a does not travel in a direction perpendicular to the light emerging surface of the light emerging ends 311 when it comes to the light emerging end 311. Therefore, the first light 30a is refracted when it travels into the air through the light emerging surface of the light emerging end 311.

For the structure depicted in FIG. 4, the following relationships apply:

$$\phi = \theta_i; \quad \text{(Equation 1)}$$

$$\theta_0 = \alpha + \theta_i; \quad \text{(Equation 2)}$$

When the light is refracted into the air (it is assumed that air has a refractive index of 1) through the light emerging surface of the light emerging ends 311, the following relationship applies:

$$n \cdot \sin(\theta_i) = \sin(\theta_0) \quad \text{(Equation 3)}$$

where n represents the refractive index of the first integration rod 31. By substituting Equations 1 and 2 into Equation 3, $\alpha = \sin^{-1}(n \cdot \sin(\phi)) - \phi$. With the refraction of the first light 30a when propagating along the longitudinal direction through the light emerging end 311, the light path is deflected with an angle (i.e. the first angle α) to be parallel to the symmetric axis L. In other words, in order to have the first light 30a to travel parallel to the symmetric axis L after being guided through the first integration rod 31, either the refractive index n of the first integration rod 31 or the angle φ of the wedge structure of the first integration rod 31 may be adjusted, so as to obtain an appropriate refractive angle.

In this embodiment, the refractive index n of the first integration rod 31 preferably ranges from 1.5 to 1.7, the first angle α preferably ranges from 5° to 20°, and the second angle $\theta_i$ preferably ranges from 30° to 45°. Additionally, considering the actual propagation path of the first light 30a, the first integration rod 31 may be designed to have a tapered configuration that has a cross-section increasing from the light incident end 313 to the light emerging end 311. This, in conjunction with the wedge structure of the light emerging end 311, will guide the first light 30a to travel in parallel with the symmetric axis L after being guided by the first integration rod 31.

The arrangement of the second integration rod 33 is symmetric with respect to the first integration rod 31, so the second light 30b emitted from the second light source 70b travels following the same principles. That is, after being guided by the second integration rod 33, the second light 30b is refracted through the light emerging surface of the light emerging end 331 thereof to travel in a direction parallel to the symmetric axis L. The principles and related structures make no difference from those of the first integration rod 31 except that the arrangement is symmetric to that of the first integration rod 31 with respect to the symmetric axis L, so no further description will be made herein.

In reference to FIGS. 3A and 3B, the light integration apparatus 3 of this embodiment further includes two reflecting mirrors 35 disposed on the top side of the light emerging ends 311, 331 and the bottom side of the light emerging ends 311, 331 respectively. The reflecting mirrors 35 and the light emerging surfaces of the first integration rod 31 and the second integration rod 33 together define a space S with an opening, so that the integrated light of the first light 30a and the second light 30b is adapted to emerge through the opening and travel substantially parallel to the symmetrical axis L towards the color wheel or other optical elements. As a result, the leakage of light on the side edges of the light integration apparatus 3 is reduced, and the hollow rod with air (the space S) may eliminate potential dark lines on the projection plane due to the boundary between the first integration rod 31 and the second integration rod 33. Actually, the opening of the space S may be considered as the projection plane projected by the light emerging surface of the light integration apparatus 3 in the direction perpendicular to the symmetric axis. Since after propagating through the projection plane, the light will eventually be guided to the DMD and then be projected outwards by the lens, the projection plane is preferably designed to be with a size suited to the DMD, for example, to be in a rectangular form with an aspect ratio of 4:3, 16:9 or 16:10.

Figure 5:
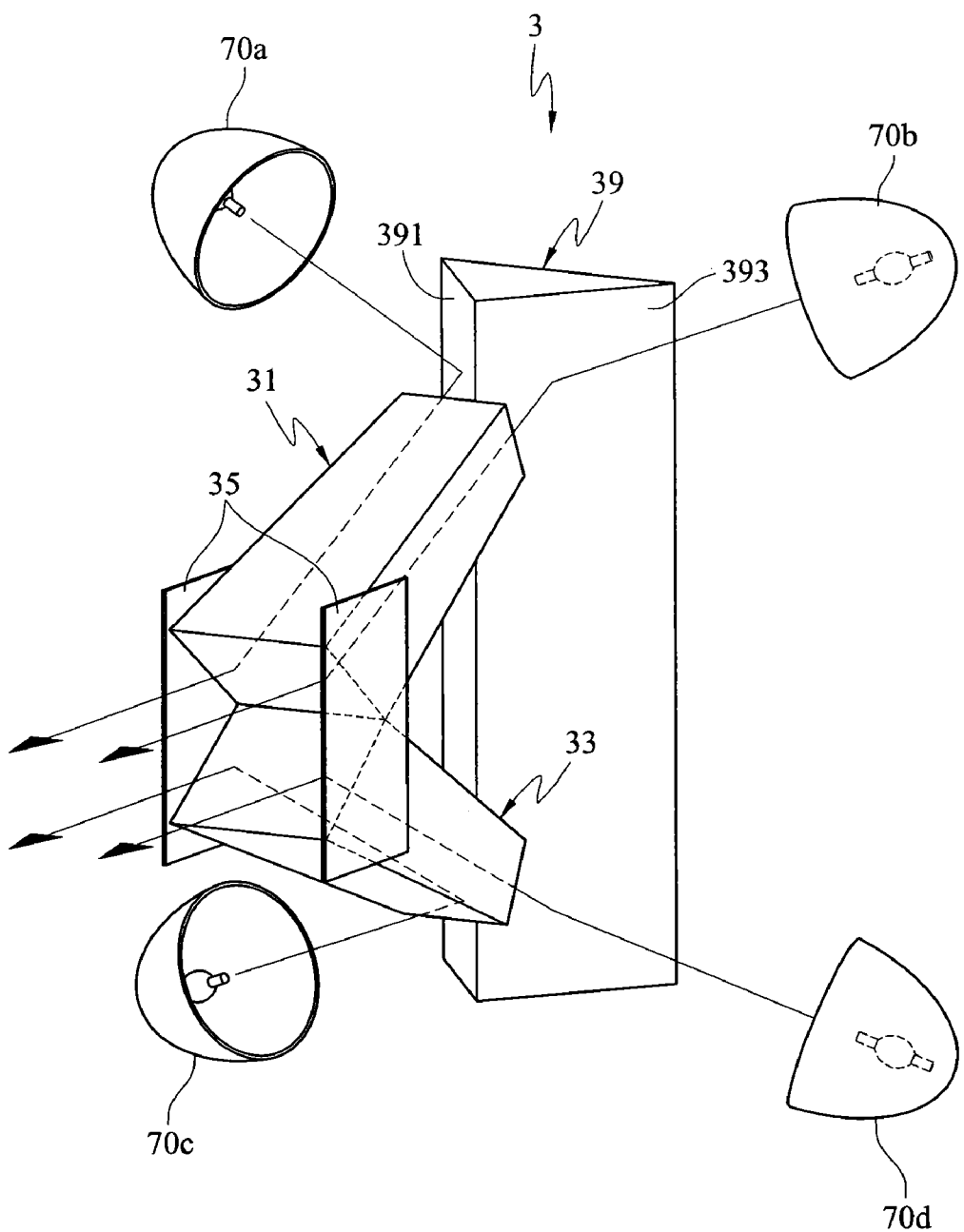
FIG. 5 is a three-dimensional illustration of the second embodiment of the present invention.

The second embodiment of the present invention applies the light integration apparatus 3 disclosed in the first embodiment to integrate four light sources, as shown in FIG. 5. The light integration apparatus 3 of the second embodiment further includes a light guiding element 39 (for example, a reflecting prism) disposed adjacent to the light incident ends 313, 333 of the first integration rod 31 and the second integration rod 33. With this arrangement, light emitted from the first light source 70a, the second light source 70b, the third light source 70c and the fourth light source 70d are guided into the light incident surfaces of the first integration rod 31 and the second integration rod 33 respectively by the light guiding element 39, so that the structure of the first embodiment can be extended to apply to four light sources.

The light guiding element 39 shown in FIG. 5 includes a first reflecting surface 391 and a second reflecting surface 393 adjacent to each other. The light emitted from the first light source 70a is reflected by the first reflecting surface 391 into the first integration rod 31, the light emitted from the second light source 70b is reflected by the second reflecting surface 393 into the first integration rod 31, the light emitted from the third light source 70c is reflected by the first reflecting surface 391 into the second integration rod 33, and the light emitted from the fourth light source 70d is reflected by the second reflecting surface 393 into the second integration rod 33. In other words, the light emitted from the first light source 70a and the second light source 70b is reflected by the first reflecting surface 391 and the second reflecting surface 393 respectively to form the first light 30a as described in the first embodiment, which subsequently travels through the light incident surface of the first integration rod 31. Likewise, the second light 30b as described in the first embodiment is formed by the light emitted from the third light source 70c and the fourth light source 70d which is reflected by the first reflecting surface 391 and the second reflecting surface 393 respectively. Finally, the first light 30a and the second light 30b are respectively guided into the body portions 310, 330 of the first integration rod 31 and the second integration rod 32 through the light incident surfaces thereof, so as to travel along the longitudinal direction and be refracted through the light emerging surfaces and then travel substantially in parallel with the symmetric axis L.

Figure 1:
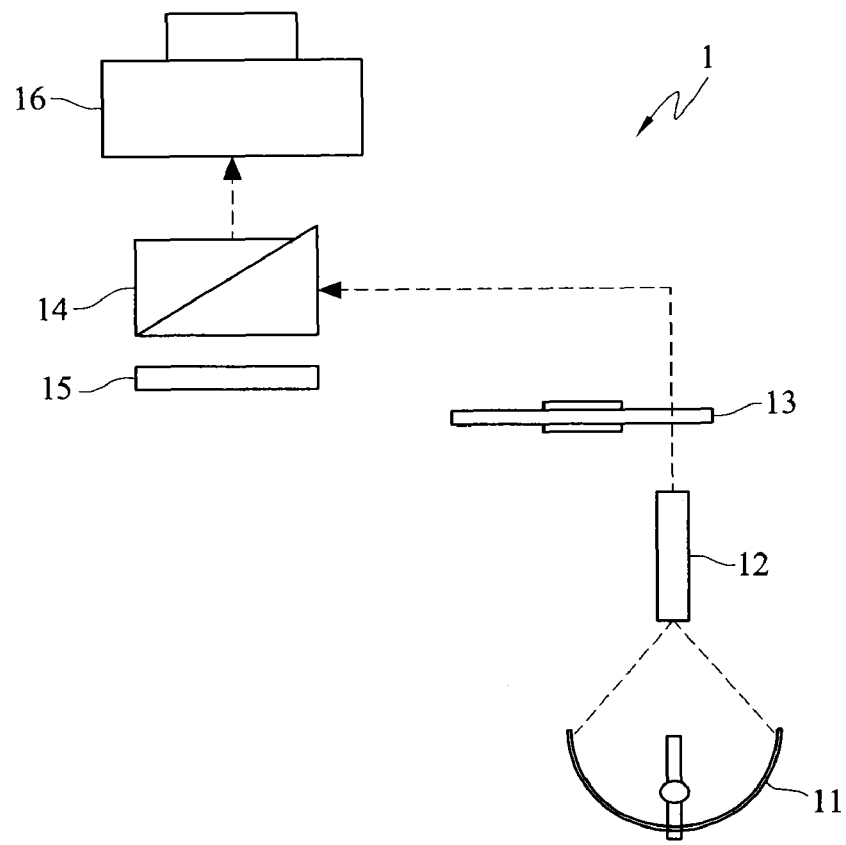
FIG. 1 is a schematic view of an internal arrangement of a conventional projection device.
Figure 2A:
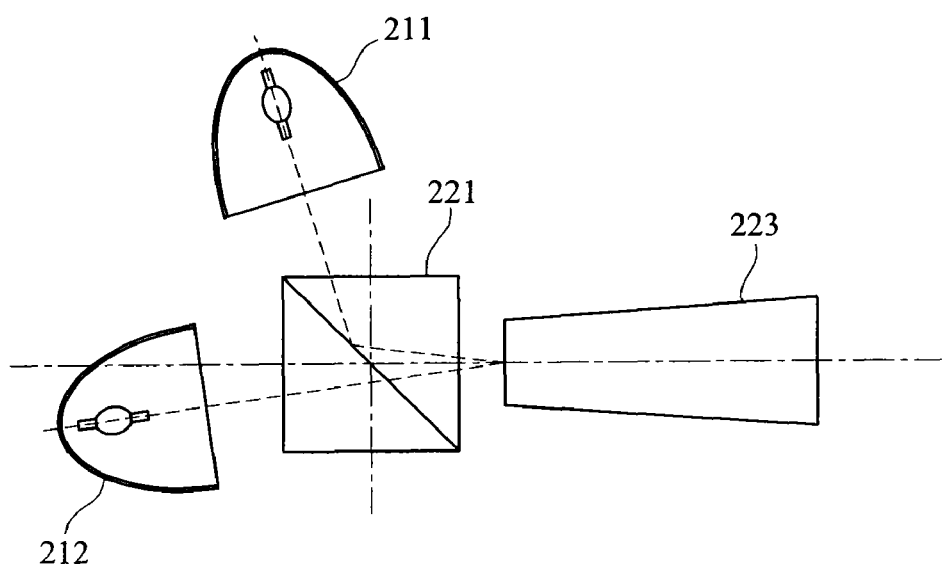
FIG. 2A is a schematic view of a conventional light integration apparatus for two light sources.
Figure 2B:
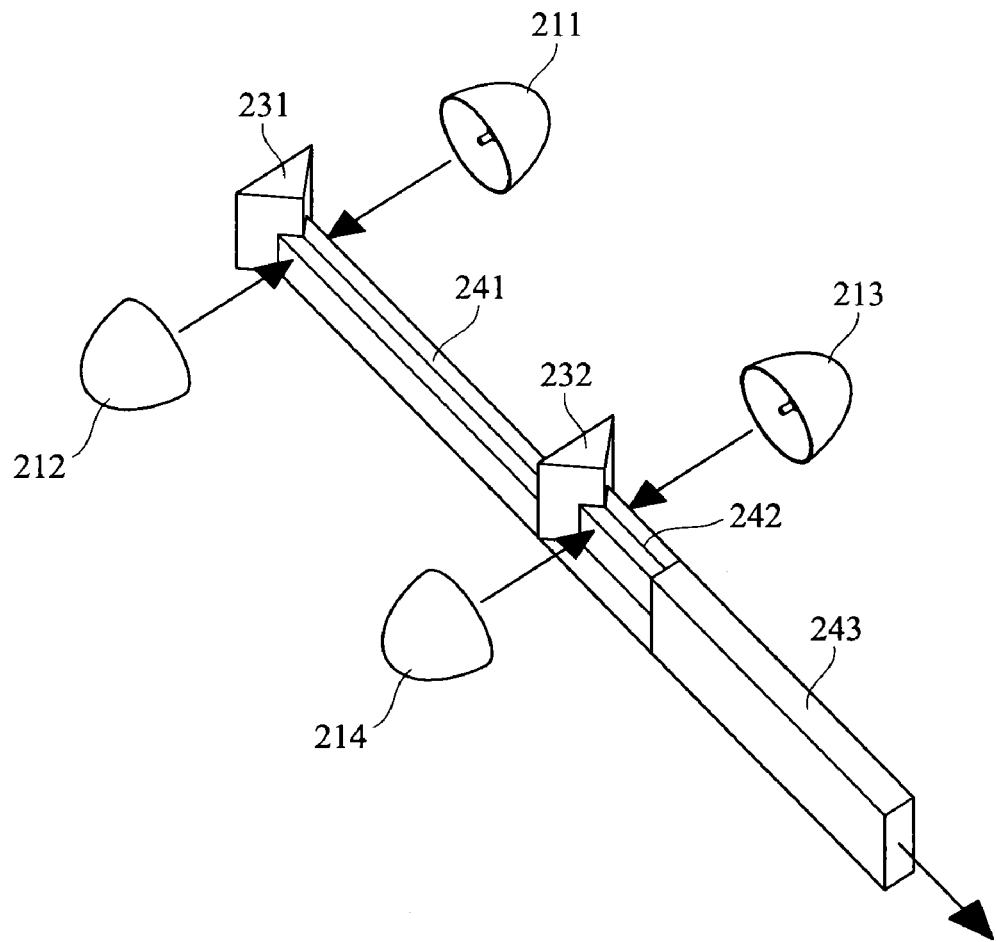
FIG. 2B is a schematic view of a conventional light integration apparatus for four light sources.

The arrangement of the second embodiment of the present invention overcomes the shortcoming in the prior art that it is difficult for the layout of the heat dissipation module because the light sources are placed on the same horizontal level as shown in FIG. 2B, because the first light source 70a, the second light source 70b, the third light source 70c and the fourth light source 70d are disposed substantially at the same side in the second embodiment of the present invention. As a result, if there are cooling fans needed to be disposed for each of the light sources, the cooling airflows can be blown towards the same direction and then be guided and vented outwards by a system fan, so as to make the layout of the heat dissipation module easier.

In summary, according to the light integration apparatus disclosed in the present invention, by disposing two integration rods at symmetrical angles with respect to a symmetric axis and through appropriate material selecting and structural design of the integration rods, light is integrated to travel in a direction parallel to the symmetric axis. As a result, the light integration apparatus is capable of integrating multiple light sources into a uniform light source with a size suitable for the DMD. Compared to the prior art, there is no integration rod disposed after the first integration rod and the second integration rod in the present invention, thus the light integration structure is simplified and unnecessary loss of light can be avoided. Furthermore, the arrangement of the light sources is easier and the efficiency of heat dissipation is increased in the present invention, so that it is convenient to maintain or replace the light sources.

The above disclosure is related to the detailed technical contents and inventive features thereof. People skilled in this field may proceed with a variety of modifications and replacements based on the disclosures and suggestions of the present invention as described without departing from the characteristics thereof. Nevertheless, although such modifications and replacements are not fully disclosed in the above descriptions, they have substantially been covered in the following claims as appended.

What is claimed is:

1. A light integration apparatus for use in a projection device, comprising a first integration rod and a second integration rod symmetrically disposed with respect to a symmetric axis, both the first integration rod and the second integration rod comprising:
    a longitudinal direction;
    a body portion extending along the longitudinal direction;
    a light emerging end facing the symmetric axis and comprising a light emerging surface and the light emerging surface is oblique to the longitudinal direction and the symmetric axis;
    a light incident end opposing to the light emerging end and comprising a light incident surface; and
    two reflecting mirrors, wherein the two reflecting mirrors, the light emerging surface of the first integration rod and the light emerging surface of the second integration rod define a space with an opening;
    wherein a first light and a second light are respectively guided into the body portions of the first integration rod and the second integration rod through the light incident surfaces thereof, the first light and the second light subsequently travel along the longitudinal direction and then are refracted by the light emerging surfaces of the first integration rod and the second integration rod respectively, and then the first and the second lights travel through the space and the opening.

2. The light integration apparatus as claimed in claim 1, wherein the light incident surface of the first integration rod is substantially perpendicular to the longitudinal direction of the first integration rod, and the light incident surface of the second integration rod is substantially perpendicular to the longitudinal direction of the second integration rod.

3. The light integration apparatus as claimed in claim 1, wherein the longitudinal direction and the symmetrical axis form a first included angle substantially lying in between 5 and 20 degrees.

4. The light integration apparatus as claimed in claim 1, wherein a normal of the light emerging surface and the longitudinal direction form a second included angle substantially lying in between 30 and 45 degrees.

5. The light integration apparatus as claimed in claim 1, wherein both the first integration rod and the second integration rod have a refractive index substantially lying in between 1.5 to 1.7.

6. The light integration apparatus as claimed in claim 1, wherein both the first integration rod and the second integration rod have a tapered configuration that has a cross-section increasing from the light incident end to the light emerging end.

7. The light integration apparatus as claimed in claim 1, wherein the opening is a projection plane perpendicular to the symmetrical axis, and the projected plane is substantially rectangular with an aspect ratio of 4:3, 16:9 or 16:10.

8. The light integration apparatus as claimed in claim 1, further comprising a light guiding element disposed adjacent to the light incident ends of the first integration rod and the second integration rod for guiding the first light and the second light into the first integration rod and the second integration rod through the light incident surfaces thereof respectively.

9. The light integration apparatus as claimed in claim 8, wherein the light guiding element is a reflecting prism.

10. The light integration apparatus as claimed in claim 9, wherein the reflecting prism comprises a first reflecting surface and a second reflecting surface adjacent to the first reflecting surface.

11. The light integration apparatus as claimed in claim 10, wherein the first light is merged by a light emitted from a first light source and reflected by the first reflecting surface and a light emitted from a second light source and reflected by the second reflecting surface.

12. The light integration apparatus as claimed in claim 11, wherein the second light is merged by a light emitted from a third light source and reflected by the first reflecting surface and a light emitted from a fourth light source and reflected by the second reflecting surface.

* * * * *